United States Patent
Baldwin et al.

(10) Patent No.: US 10,282,393 B2
(45) Date of Patent: May 7, 2019

(54) CONTENT-TYPE-AWARE WEB PAGES

(71) Applicant: International Business Machines Corporation, Armonk, NY (US)

(72) Inventors: Nicholas A. Baldwin, Gladesville (AU); Stefan A. Hepper, Morgan Hill, CA (US); William J. Izard, Sydney (AU); Eric T. Martinez de Morentin, Manly (AU)

(73) Assignee: International Business Machines Corporation, Armonk, NY (US)

( * ) Notice: Subject to any disclaimer, the term of this patent is extended or adjusted under 35 U.S.C. 154(b) by 164 days.

(21) Appl. No.: 14/876,981

(22) Filed: Oct. 7, 2015

(65) Prior Publication Data

US 2017/0103044 A1     Apr. 13, 2017

(51) Int. Cl.
   *G06F 17/21*     (2006.01)
   *G06F 17/24*     (2006.01)
   *G06F 17/30*     (2006.01)

(52) U.S. Cl.
   CPC .......... *G06F 17/212* (2013.01); *G06F 17/248* (2013.01); *G06F 17/30893* (2013.01); *G06F 17/30905* (2013.01)

(58) Field of Classification Search
   CPC .......... G06F 17/2247; G06F 8/30; G06F 8/34; G06F 3/0486; G06F 3/0482; G06F 3/0487; G06F 17/246; G06F 17/243; G06F 17/248; G06F 17/241; G06F 17/211
   See application file for complete search history.

(56) References Cited

U.S. PATENT DOCUMENTS

| | | | | |
|---|---|---|---|---|
| 6,304,886 | B1* | 10/2001 | Bernardo | G06F 17/211 707/E17.112 |
| 6,684,369 | B1* | 1/2004 | Bernardo | G06F 17/211 707/E17.116 |
| 7,620,936 | B2 | 11/2009 | Ernst et al. | |
| 8,607,139 | B2 | 12/2013 | Alexander | |
| 8,671,119 | B2 | 3/2014 | Tulkoff et al. | |
| 8,914,729 | B2 | 12/2014 | Dubinko et al. | |
| 2005/0125716 | A1* | 6/2005 | Cragun | G06F 17/241 715/222 |

(Continued)

FOREIGN PATENT DOCUMENTS

| | | |
|---|---|---|
| WO | 0159626 A1 | 8/2001 |
| WO | 2007106185 A2 | 9/2007 |

*Primary Examiner* — Stephen S Hong
*Assistant Examiner* — Ahamed I Nazar
(74) *Attorney, Agent, or Firm* — Bryan D. Wells

(57) ABSTRACT

Content-type-aware web pages are provided. One or more content items that are associated with a web page are identified based, at least in part, on web page metadata. One or more content templates that are associated with the web page are identified based, at least in part, on the web page metadata. Each of the one or more content items are filtered into either a first group or a second group based, at least in part, on the one or more content templates. Each content item in the first group is associated with at least one of the one or more content templates. Each content item in the second group is not associated with the one or more content templates. Instructions to render the content items in the first group are generated based, at least in part, on the one or more content templates.

20 Claims, 11 Drawing Sheets

(56) References Cited

U.S. PATENT DOCUMENTS

| | | | |
|---|---|---|---|
| 2007/0033531 A1* | 2/2007 | Marsh | G06F 17/30864 715/738 |
| 2007/0106508 A1* | 5/2007 | Kahn | G10L 15/22 704/235 |
| 2008/0040322 A1* | 2/2008 | Rucker | G06F 17/30896 |
| 2009/0043727 A1* | 2/2009 | Cohen, Jr. | G06F 17/30902 |
| 2009/0235158 A1* | 9/2009 | Rosenstein | G06F 17/24 715/234 |
| 2010/0050098 A1* | 2/2010 | Turner | G06F 17/30038 715/763 |
| 2010/0070847 A1* | 3/2010 | Hampton | G06F 17/3089 715/234 |
| 2010/0070888 A1* | 3/2010 | Watabe | G06F 3/0481 715/760 |
| 2012/0167005 A1* | 6/2012 | Matthews | G09G 5/14 715/799 |
| 2013/0047071 A1* | 2/2013 | Haubrich | G06F 17/3089 715/234 |
| 2013/0124953 A1* | 5/2013 | Fan | G06F 17/212 715/202 |
| 2013/0145255 A1* | 6/2013 | Zheng | G06F 17/30867 715/234 |
| 2014/0006919 A1* | 1/2014 | He | G06F 17/241 715/230 |
| 2014/0046980 A1* | 2/2014 | Kleinschmidt | G06F 17/30896 707/793 |
| 2014/0281907 A1* | 9/2014 | Baldwin | G06F 17/2247 715/234 |
| 2014/0372873 A1* | 12/2014 | Leung | G06F 17/3089 715/243 |
| 2015/0007132 A1* | 1/2015 | Baldwin | G06F 17/3089 717/110 |
| 2015/0227270 A1* | 8/2015 | Yun | G06F 3/0482 715/202 |
| 2016/0224642 A1* | 8/2016 | Miller | G06F 3/04842 |

* cited by examiner

CONTENT-TYPE-AWARE WEB PAGES

TECHNICAL FIELD

The present invention relates generally to the field of web page design and, more particularly, to content-type-aware web pages.

BACKGROUND

A web template system uses a template processor to combine web templates to form finished web pages, generally using one or more data sources to customize the pages or present a large amount of content on similar-looking web pages. Web templates are publishing tools present in content management systems, web application frameworks, and HTML editors. Web templates can be used like templates for form letters to generate a large number of "static" (i.e., unchanging) web pages in advance or produce "dynamic" web pages on demand.

Web templates can be used by any individual or organization to set up web pages within their respective websites. Once a template is purchased or downloaded, users will replace all generic information included in the web template with any personal, organizational or product information that they wish to convey. Common web templates include template designed to: display personal information or daily activities (e.g., in the form of a blog); sell products on-line; display information about a company or organization; display family history; display a gallery of photos; place music files such as MP3 files on-line for play through a web browser; place videos on-line for public viewing; and to set up a private login area on-line, amongst many others.

SUMMARY

According to one embodiment of the present invention, a method for creating content-type-aware web pages is provided. The method includes: identifying, by one or more computer processors, one or more content items that are associated with a web page based, at least in part, on web page metadata that is associated with the web page; identifying, by one or more computer processors, one or more content templates that are associated with the web page based, at least in part, on the web page metadata; filtering, by one or more computer processors, each of the one or more content items into either a first group or a second group based, at least in part, on the one or more content templates, wherein: each content item in the first group is associated with at least one of the one more content templates; and each content item in the second group is not associated with the one or more content templates; and generating, by one or more computer processors, instructions to render the content items in the first group based, at least in part, on the one or more content templates.

According to another embodiment of the present invention, a computer program product for creating content-type-aware web pages is provided. The computer program product comprises a computer readable storage medium and program instructions stored on the computer readable storage medium. The program instructions include: program instructions to identify one or more content items that are associated with a web page based, at least in part, on web page metadata that is associated with the web page; program instructions to identify one or more content templates that are associated with the web page based, at least in part, on the web page metadata; program instructions to filter each of the one or more content items into either a first group or a second group based, at least in part, on the one or more content templates, wherein: each content item in the first group is associated with at least one of the one more content templates; and each content item in the second group is not associated with the one or more content templates; and program instructions to generate instructions to render the content items in the first group based, at least in part, on the one or more content templates.

According to another embodiment of the present invention, a computer system for creating content-type-aware web pages is provided. The computer system includes one or more computer processors, one or more computer readable storage media, and program instructions stored on the computer readable storage media for execution by at least one of the one or more processors. The program instructions include: program instructions to identify one or more content items that are associated with a web page based, at least in part, on web page metadata that is associated with the web page; program instructions to identify one or more content templates that are associated with the web page based, at least in part, on the web page metadata; program instructions to filter each of the one or more content items into either a first group or a second group based, at least in part, on the one or more content templates, wherein: each content item in the first group is associated with at least one of the one more content templates; and each content item in the second group is not associated with the one or more content templates; and program instructions to generate instructions to render the content items in the first group based, at least in part, on the one or more content templates.

DETAILED DESCRIPTION

Embodiments of the present disclosure recognize that only a portion of the content that a web page displays is "primary content," as opposed to "secondary content" such as banners, teaser content, advertisements, and social media widgets. "Primary content" is generally content that is URL addressable and rendered in the main area of the web page. For example, "primary content" on a web page for an online store is generally a list of product descriptions or a detailed description of a specific product. Web content management systems provide various "page templates" that web page owners can customize according to their needs. Page templates, however, generally have static references to the content that is displayed on the web page. The relationship between specific content items and where the content is rendered within the web page are static properties. Consequently, customizing a page template is generally slow and expensive, even though there are often only relatively minor variations between page structures to account for different types of "primary content." Embodiments of the present disclosure recognize that an associations between the types of primary content and the web pages are missing when utilizing strictly-typed page templates.

Embodiments of the present disclosure provide web content management software that provides for associating one or more types of primary content with the web page on which the content is displayed. The web content management software provides page templates having generic components for displaying "primary content." The generic components query web pages for page-to-type associations (i.e., associations between types of primary content and web pages) and filter content items such that content items that are not associated with "primary content" are not displayed in the main areas of web pages (i.e., the generic components ignore secondary, helper content items). The web content management software also provides a user interface that includes menus that expose any page-to-type associations when associating content items with web pages. The menus utilize the page-to-type associations to provide content authors with suggestions as to the type of "primary content" to include on a web page (i.e., suggestions to use one or more content templates, as described herein), as opposed to requiring content authors to guess at an appropriate type of "primary content" for a given web page.

Figure 1:
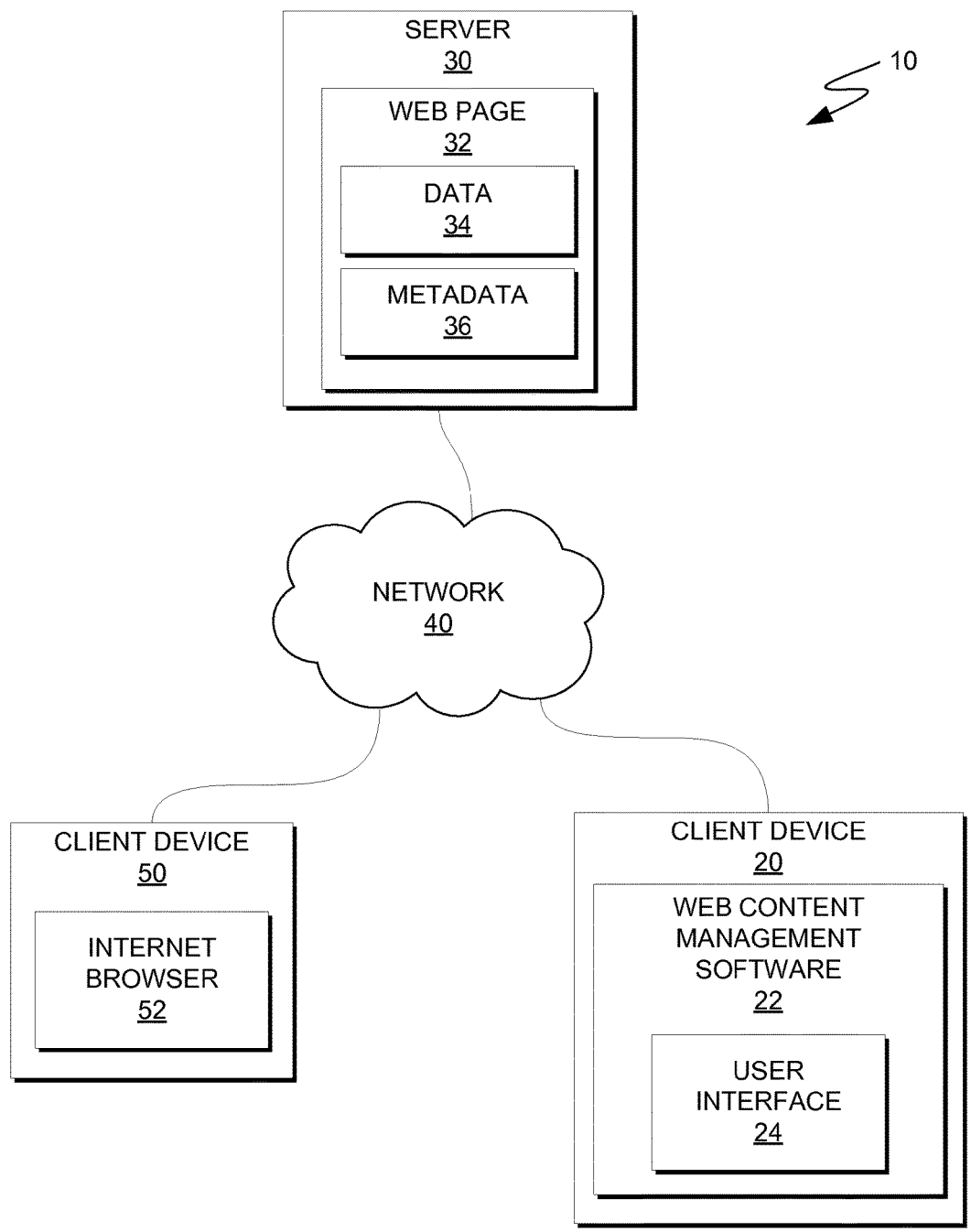
FIG. 1 is a block diagram illustrating a computing environment, in accordance with an embodiment of the present disclosure.

Embodiments of the present disclosure will now be described in detail with reference to the Figures. FIG. 1 is a functional block diagram illustrating a computing environment, in accordance with an embodiment of the present disclosure. For example, FIG. 1 is a functional block diagram illustrating computing environment 10. Computing environment 10 includes client device 20, client device 50, and server 30 connected over network 40. Client device 20 includes web content management software 22. Data 34 and metadata 36 describe web page 32 and reside on server 30. Client device 50 includes internet browser 52.

In various embodiments, client device 20 is a computing device that can be a standalone device, a server, a laptop computer, a tablet computer, a netbook computer, a personal computer (PC), or a desktop computer. In another embodiment, client device 20 represents a computing system utilizing clustered computers and components to act as a single pool of seamless resources. In general, client device 20 can be any computing device or a combination of devices with access to data 34 and metadata 36 of web page 32 on server 30, and with access to and/or capable of executing web content management software 22. Client device 20 may include internal and external hardware components, as depicted and described in further detail with respect to FIG. 2.

In this embodiment, web content management software 22 resides on client device 20. In other embodiments, web content management software 22 can reside on another computing device, provided that each can access and is accessible by each other, and provided that each can access data 34 and metadata 36 of web page 32. In yet other embodiments, web content management software 22 can be stored externally and accessed through a communication network, such as network 40. Network 40 can be, for example, a local area network (LAN), a wide area network (WAN) such as the Internet, or a combination of the two, and may include wired, wireless, fiber optic or any other connection known in the art. In general, network 40 can be any combination of connections and protocols that will support communications between client device 20 and server 30 and client device 50 and server 30, in accordance with a desired embodiment of the present disclosure.

Web content management software 22 operates to enable a user of client device 20 to create web pages (e.g., web page 32) using various templates, as described herein. For example, web content management software 22 includes page templates having generic components that can be used to construct web pages having various types of "primary content." Constructed web pages are deployed on server 30. In some embodiments, client device 20 stores and executes web content management software 22 locally. In such embodiments, data 34 and metadata 36 are generated on client device 20 and can reside on client device 20 prior to deployment on server 30. In other embodiments, server 30 stores and executes web content management software 22 (e.g., on a virtual machine that is hosted on server 30), wherein client device 20 is a "thin" client that receives instructions from the user via user interface 24 and transmits the instructions to server 30.

Web content management software 22 presents user interface 24 to a user of client device 20. Web content management software 22 receives user input, at least in part, via user interface 24, thereby enabling the user to interact with web content management software 22. In various examples, the user interacts with user interface 24 in order to create and configure web page 32. In one embodiment, logic to present user interface 24 on client device resides on client device 20. In other embodiments, logic to present user interface 24 on client device 20 resides on another computing device (e.g., server 30), provided that logic to present user interface 24 can access and is accessible by web content management software 22.

In various embodiments, server 30 is a computing device that can be a standalone device, a server, a laptop computer, a tablet computer, a netbook computer, a personal computer (PC), a desktop computer, a personal digital assistant (PDA), a smart phone, or any programmable electronic device capable of communicating with client devices 20 and 50 via 40. In another embodiment, server 30 represents a computing system utilizing clustered computers and components to act as a single pool of seamless resources. In general, server 30 can be any computing device or a combination of devices with access to client device 20 and client device 50, and with access to and/or capable of storing data 34 and metadata 36 of web page 32. Accordingly, server 30 can include one or more data repositories that can be written to and read by web content management software 22 in order to deploy web page 32 on server 30 (i.e., store data 34 and metadata 36 on server 30). In general, data 34 and metadata 36 include data that is generated by web content management software 22 and that describes the content and configuration of web page 32. For example, data 34 can include information pertaining to a page template, one or more content templates, and one or more content items from which web page 32 is rendered in response to a HTTP request. Metadata 36 can include data that associates one or more content templates with web page 32 and data that associates one or more content items with respective content template(s). Server 30 can include internal and external hardware components, as depicted and described in further detail with respect to FIG. 2.

In various embodiments, client device 50 is a computing device that can be a standalone device, a laptop computer, a tablet computer, a netbook computer, a personal computer (PC), or a desktop computer. In general, client device 50 can be any computing device or a combination of devices with server 30, and with access to and/or capable of executing internet browser 52 such that a user of client device 50 can view web page 32 or another web page that was created using web content management software 22 and that is deployed on server 30. Client device 20 may include internal and external hardware components, as depicted and described in further detail with respect to FIG. 2.

Figure 2:
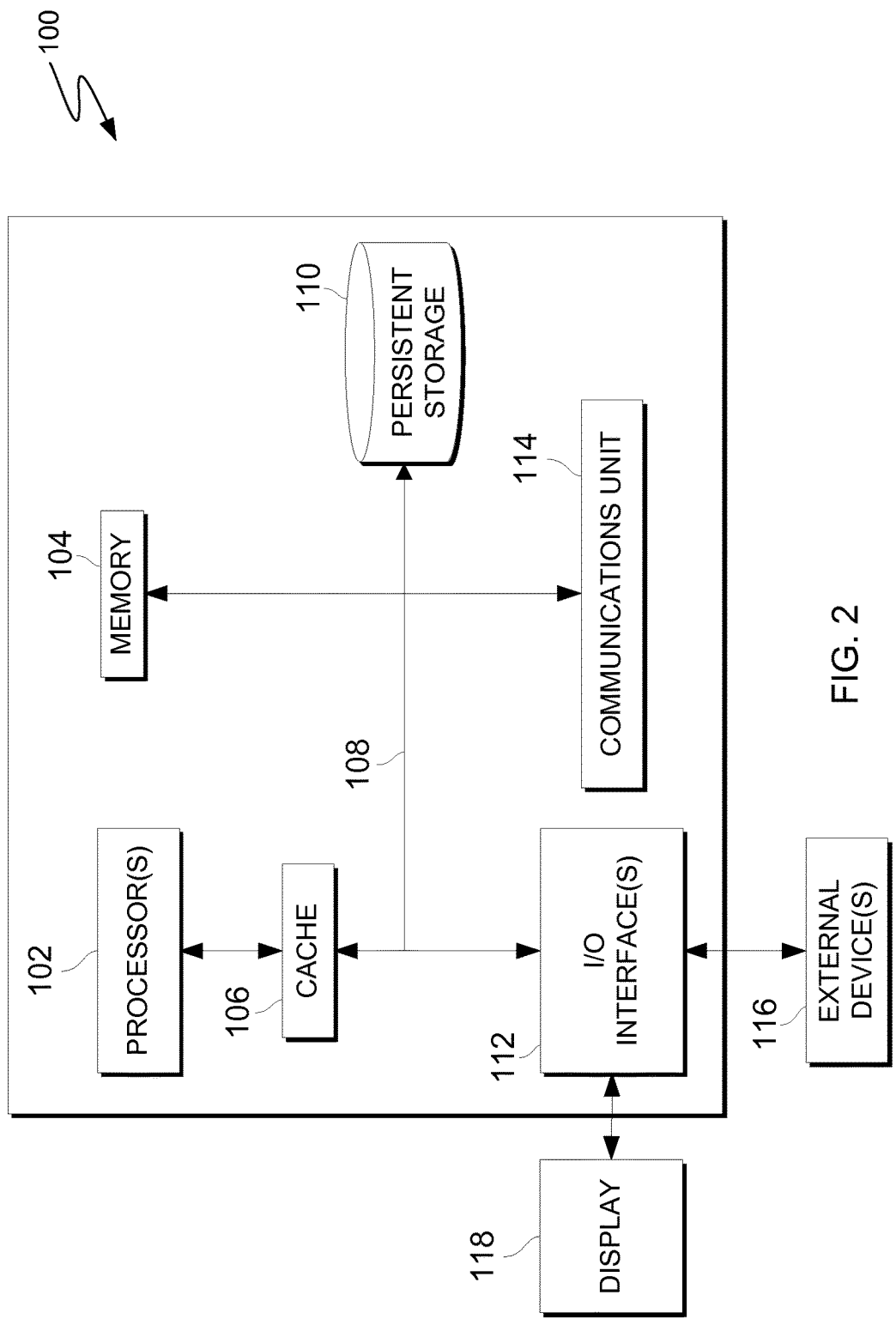
FIG. 2 is a block diagram of components of a computing device for executing web content management software, in accordance with an embodiment of the present disclosure.

FIG. 2 is a block diagram of components of a computing device, generally designated computing system 100, in accordance with an embodiment of the present disclosure. In various embodiments, computing system 100 is representative of a device within computing environment 10, in which case computing system 100 includes web content management software 22.

It should be appreciated that FIG. 2 provides only an illustration of one implementation and does not imply any limitations with regard to the environments in which different embodiments may be implemented. Many modifications to the depicted environment may be made.

Computing system 100 includes processor(s) 102, cache 106, memory 104, persistent storage 110, input/output (I/O) interface(s) 112, communications unit 114, and communications fabric 108. Communications fabric 108 provides communications between cache 106, memory 104, persistent storage 110, communications unit 114, and input/output (I/O) interface(s) 112. Communications fabric 108 can be implemented with any architecture designed for passing data and/or control information between processors (such as microprocessors, communications and network processors, etc.), system memory, peripheral devices, and any other hardware components within a system. For example, communications fabric 108 can be implemented with one or more buses or a crossbar switch.

Memory 104 and persistent storage 110 are computer readable storage media. In this embodiment, memory 104 includes random access memory (RAM). In general, memory 104 can include any suitable volatile or non-volatile computer readable storage media. Cache 106 is a fast memory that enhances the performance of processor(s) 102 by holding recently accessed data, and data near recently accessed data, from memory 104.

Program instructions (e.g., web content management software 22) and/or data (e.g., data 34 and metadata 36 of web page 32) used to practice embodiments of the present disclosure can be stored in persistent storage 110 and in memory 104 for execution by one or more of the respective processor(s) 102 via cache 106. In an embodiment, persistent storage 110 includes a magnetic hard disk drive. Alternatively, or in addition to a magnetic hard disk drive, persistent storage 110 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 110 may also be removable. For example, a removable hard drive may be used for persistent storage 110. Other examples include optical and magnetic disks, thumb drives, and smart cards that are inserted into a drive for transfer onto another computer readable storage medium that is also part of persistent storage 110.

Communications unit 114, in these examples, provides for communications with other data processing systems or devices. In these examples, communications unit 114 includes one or more network interface cards. Communications unit 114 may provide communications through the use of either or both physical and wireless communications links. Program instructions and data used to practice embodiments of the present disclosure may be downloaded to persistent storage 110 through communications unit 114.

I/O interface(s) 112 allows for input and output of data with other devices that may be connected to computing system 100. For example, I/O interface(s) 112 may provide a connection to external device(s) 116 such as a keyboard, keypad, a touch screen, and/or some other suitable input device. External device(s) 116 can also include portable computer readable storage media such as, for example, thumb drives, portable optical or magnetic disks, and memory cards. Software and data used to practice embodiments of the present disclosure can be stored on such portable computer readable storage media and can be loaded onto persistent storage 110 via I/O interface(s) 112. I/O interface(s) 112 also connect to display 118.

Display 118 provides a mechanism to display or present data to a user and may be, for example, a computer monitor.

Figure 3:
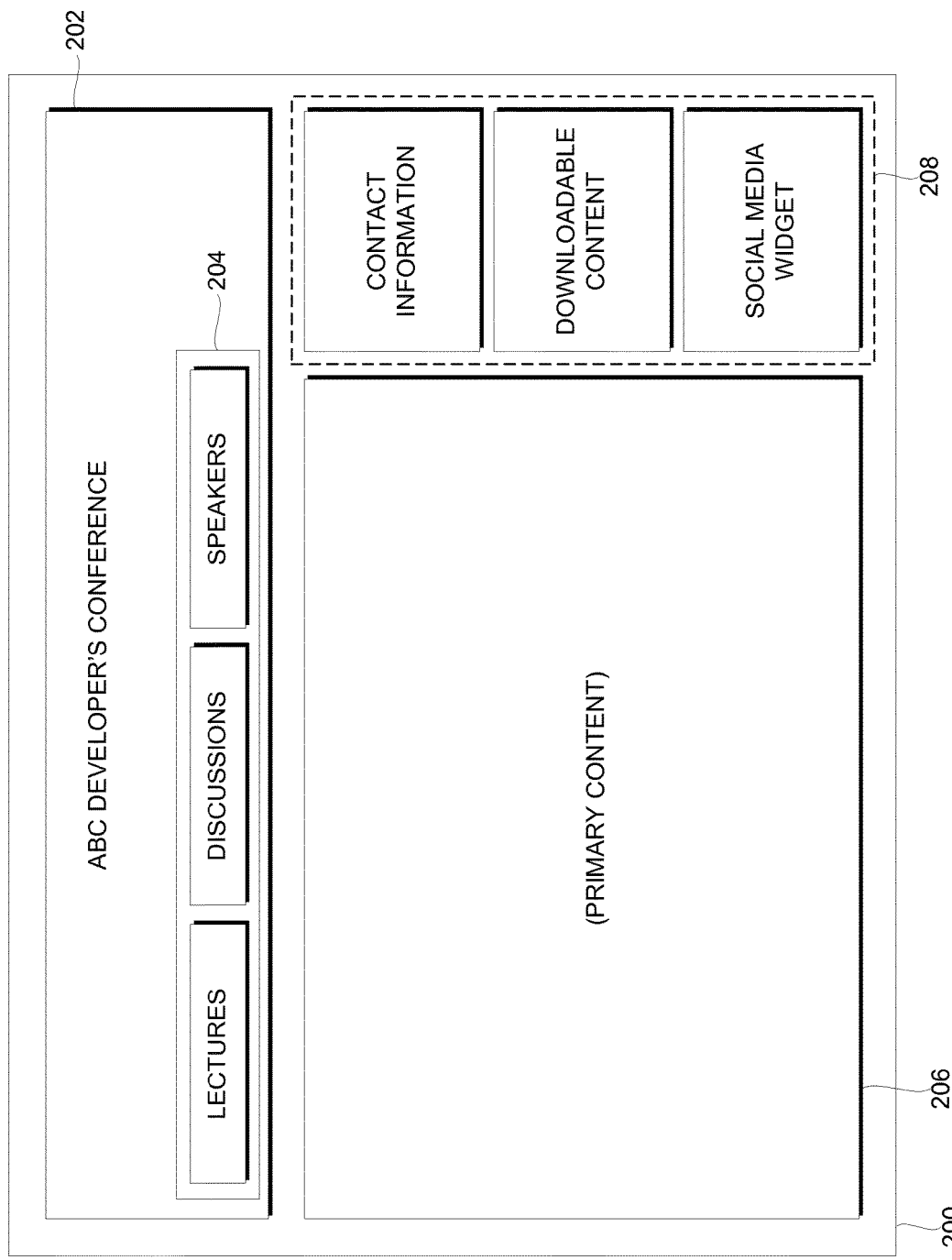
FIG. 3 is a schematic diagram depicting a page template of web content management software 22, in accordance with an embodiment of the present disclosure.

FIG. 3 is a schematic diagram depicting a page template of web content management software 22, in accordance with an embodiment of the present disclosure. Specifically, FIG. 2 depicts page template 200, from which a user of client device 20 can create one or more web pages (e.g., web page 32) using web content management software 22.

Figure 9:
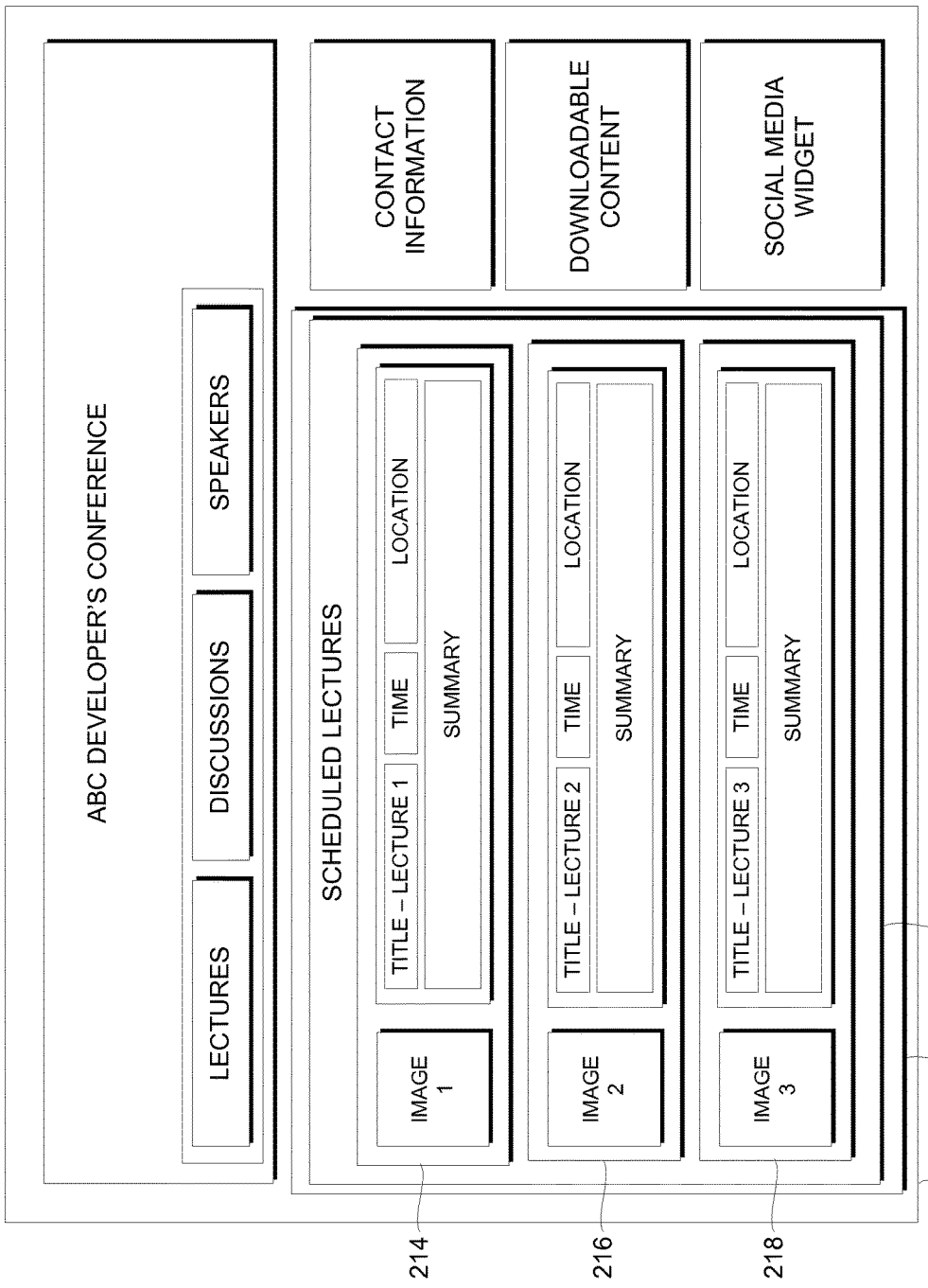
FIG. 9 is a schematic diagram of a web page that includes a generic component that generates instructions to render a content item based, at least in part, on the association between the web page and the content template depicted in FIG. 5, in accordance with an embodiment of the present disclosure.

As depicted in FIG. 3, page template 200 includes generic components and customized components. For example, page template 200 includes banner 202, which is a banner that is customized for use with various web pages including information relating to a conference including various lectures and discussions. Banner 202 includes menu 204. Menu 204 enables visitors to navigate to web pages that are associated with web page 32. Page template 200 also includes generic component 206. In general, generic component 206 generates instructions to render one or more content items that are children of web page 32 and associated with a content template based, at least in part, on metadata 36. Accordingly, generic component 206 is not bound to a specific content template and can be used to render various types of "primary content." For example, the "primary content" of a first embodiment of web page 32 is a list of lectures, as depicted in FIG. 9. The "primary content" of a second embodiment of web page 32 is a list of discussions and the "primary content" of a third embodiment of web page 32 is a list of speakers. In general, "primary content" is content that is created for a specific web page and displayed within the main area of the web page, as opposed to "secondary content" or "helper content" (e.g., banners, advertisements, or teasers) that is reused on various pages of a website and generally occupies a relatively small portion of web page 32. Page template 200 also includes "secondary content" 208. In the embodiment depicted in FIG. 3, for example, "secondary content" 208 includes contact information, links to downloadable content, and a social media widget.

Figure 4:
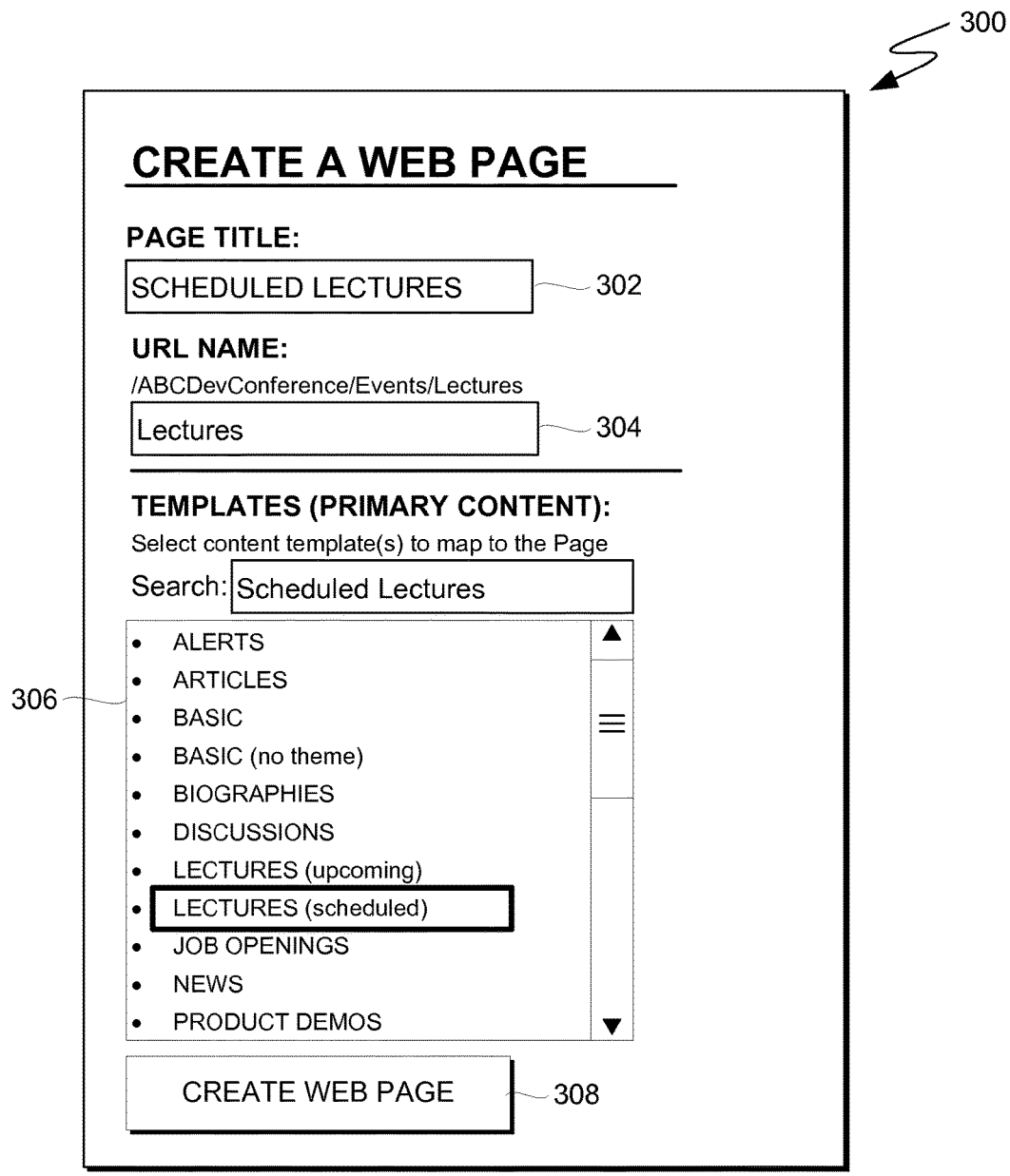
FIG. 4 is a schematic diagram of a user interface for creating a web page that is associated with one or more content templates, in accordance with an embodiment of the present disclosure.

FIG. 4 is a schematic diagram of a user interface for creating a web page that is associated with one or more content templates, in accordance with an embodiment of the present disclosure. Specifically, FIG. 4 depicts menu 300, which is presented on client device 20 via user interface 24. In FIG. 4, a web page for listing scheduled lectures is created using menu 300.

Menu 300 is a menu for creating a web page that is associated with one or more content templates. For example, menu 300 includes page title field 302 and URL name field 304. Page title field 302 and URL name field 304 are text fields in which a user of web content management software 22 can respectively enter the title and URL address of a web page that the user wishes to create. Menu 300 also includes content template list 306. Content template list 306 is a searchable list of content templates that are available via web content management software 22. As described in greater detail with respect to FIG. 5, a content template is a template that describes how to render a specific type of "primary content." For example, content template list 306 includes content templates that describe how to render a list of articles, a list of biographies, a list of discussion, and a list of upcoming or scheduled lectures, among other types of "primary content." Many types of content templates and variations on content templates can exist in order to render various types of "primary content." Accordingly, it is advantageous to enable searching content template list 306 for a specific content template. In the embodiment depicted in FIG. 4, for example, a user created a web page titled "SCHEDULED LECTURES" and selected the "LECTURES (scheduled)" content template based on a search for the title of the web page. In some embodiments, the user can select only one content template from content template list 306. In other embodiments, the user can select one or more content templates from content template list 306 and associate each of a plurality of generic components (e.g., each instance among a plurality of instances of generic component 206) with respective content templates.

Menu 300 also includes button 308. Clicking or pressing on button 308 creates a web page having the title and the URL address entered into page title field 302 and URL name field 304 respectively. In addition, clicking or pressing on button 308 creates and/or adds to metadata (e.g., metadata 36) that, at least in part, associates any content templates selected from content template list 306 with the created web page. In some embodiments, menu 300 also associates a page template (e.g., page template 200) with the created web page. In other embodiments, user interface 24 provides a different menu through which the user can associate the page template with the created web page.

Figure 5:
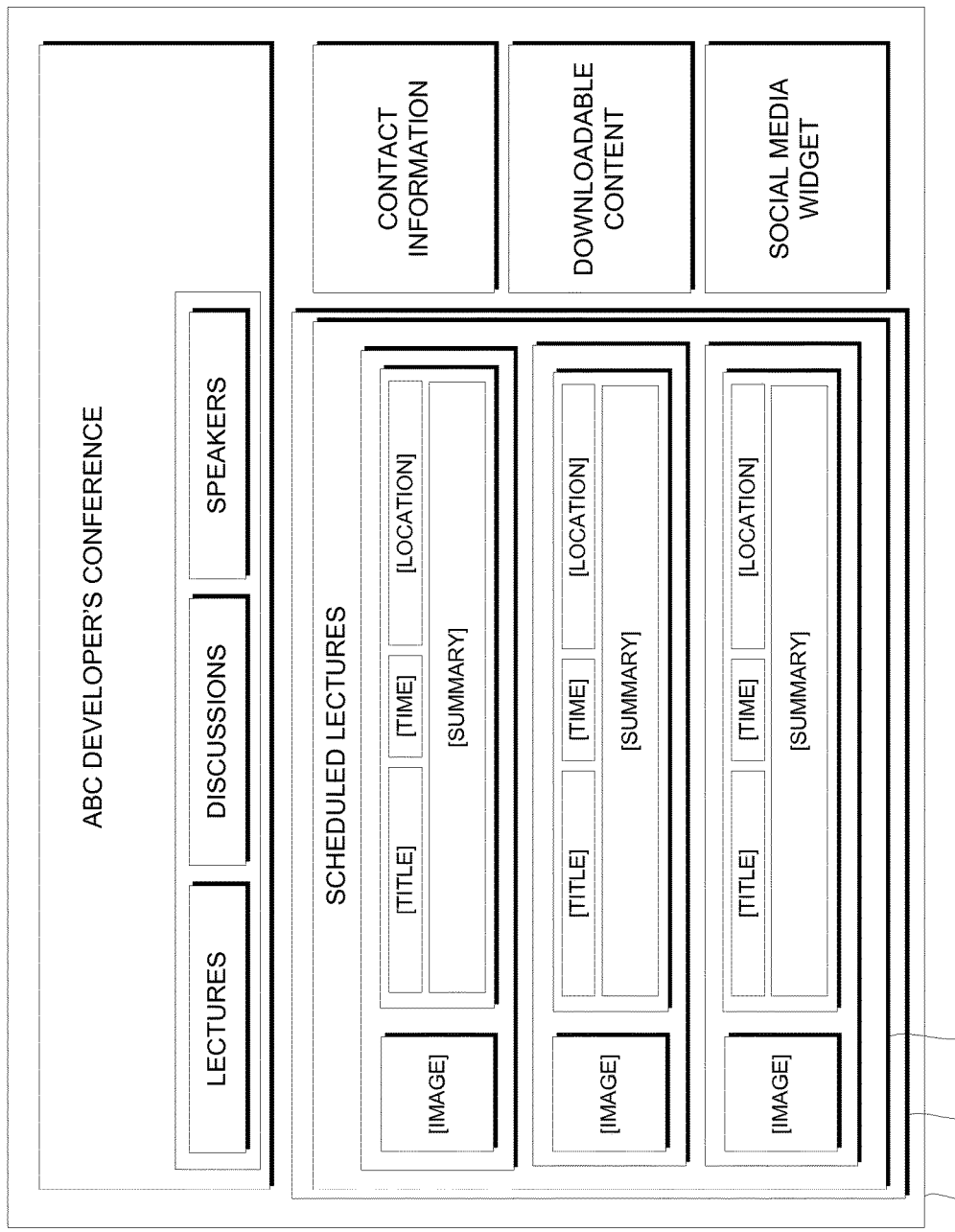
FIG. 5 is a schematic diagram depicting a web page that is associated with the content template selected in FIG. 4, in accordance with an embodiment of the present disclosure.

FIG. 5 is a schematic diagram depicting a web page that is associated with the content template selected in FIG. 4, in accordance with an embodiment of the present disclosure. Specifically, FIG. 5 depicts scheduled lectures content template 210, as rendered in accordance with instructions generated by generic component 206 of page template 200. In the embodiment depicted in FIG. 5, scheduled lectures content template 210 is not associated with any content items (i.e., child content items of the web page), and therefore, generic component 206 does not generate instructions to render information pertaining to specific lectures. In some embodiments, user interface 24 provides a view of content templates that are not associated with specific content items in order to show a user of web content management software 22 the various types of information that generic component 206 can render using a selected content template. Scheduled lectures content template 210 provides a list of scheduled lectures, and for each lecture, provides the title, the time, the location, an image, and a summary of the topic of the lecture. As described in greater detail with respect to FIG. 7, a user of web content management software 22 can associate one or more content items (e.g., data objects that are associated with specific lectures) with the web page, as child objects, to populate the fields depicted in FIG. 5.

Figure 6:
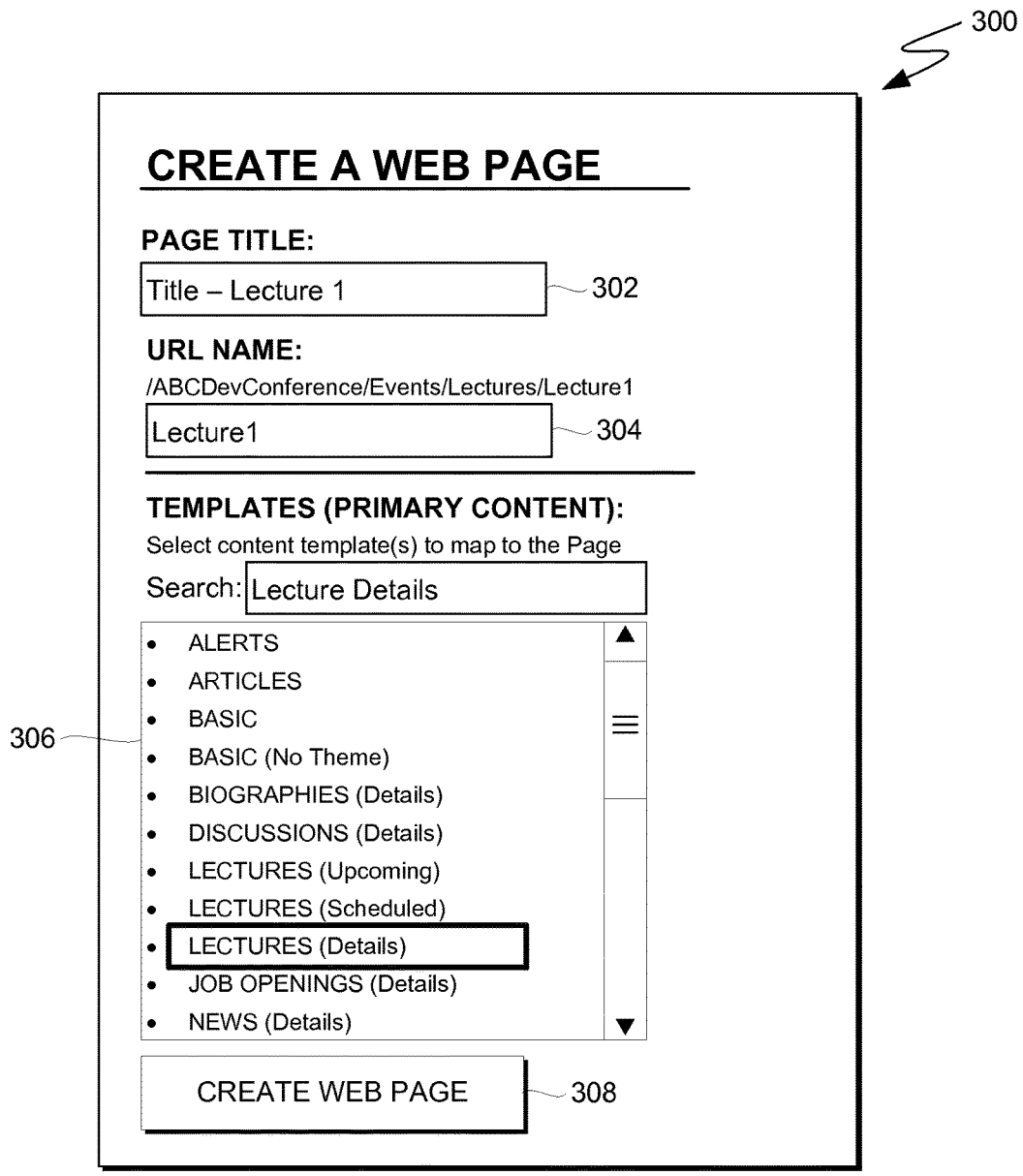
FIG. 6 is a schematic diagram of a user interface for creating a web page that is associated with one or more content templates, in accordance with an embodiment of the present disclosure.

FIG. 6 is a schematic diagram of a user interface for creating a web page that is associated with one or more content templates, in accordance with an embodiment of the present disclosure. Specifically, FIG. 6 depicts menu 300, which is presented on client device 20 via user interface 24. In FIG. 6, a web page for providing details pertaining to a specific lecture is created.

In the example depicted in FIG. 6, a user of web content management software 22 created a second web page based, at least in part, on page template 200. In this example, the user enters the title of a lecture into page title field 302 and the URL address of the web page into URL name field 304. In addition, the user has selected the "LECTURES (Details)" content template from content template list 306 based, at least in part, on a search for content templates titled "lecture details." Clicking or pressing on button 308 creates a web page having the title and the URL address respectively entered into page title field 302 and URL name field 304 and generates and/or adds to metadata 36 data that, at least in part, associates the created web page with the "LECTURES (Details)" content template.

Figure 7:
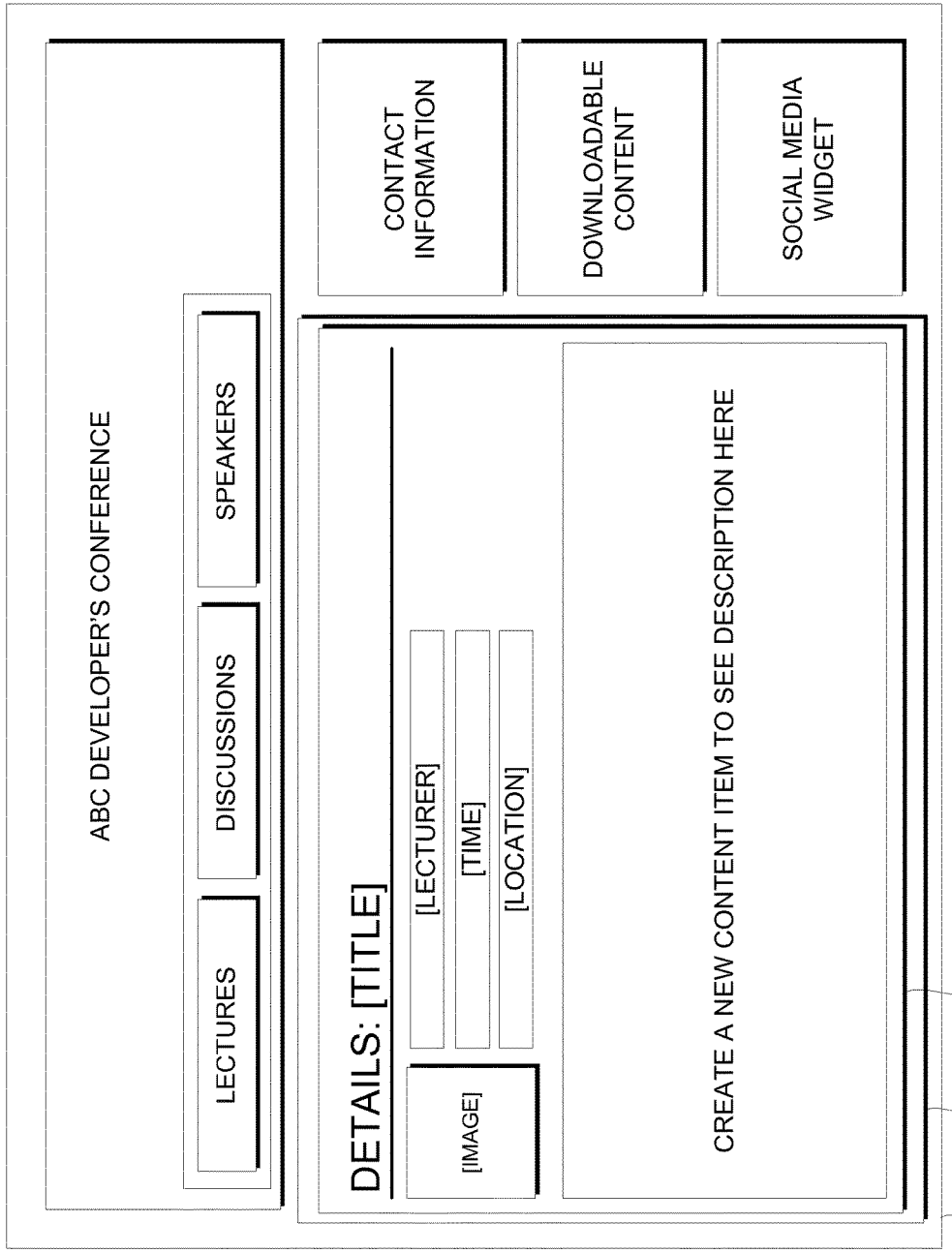
FIG. 7 is a schematic diagram depicting a web page that is associated with the content template selected in FIG. 6, in accordance with an embodiment of the present disclosure.

FIG. 7 is a schematic diagram depicting a web page that is associated with the content template selected in FIG. 6, in accordance with an embodiment of the present disclosure. Specifically, FIG. 7 depicts lecture details content template 212, as rendered using instructions generated by generic component 206 of page template 200. In the embodiment depicted in FIG. 7, lecture details content template 212 is not associated with any content items, and therefore, instructions generated by generic component 206 do not render information pertaining to a specific lecture. Like the view depicted in FIG. 5, some embodiments of user interface 24 provide this type of view in order to show a user of web content management software 22 the various types of information that generic component 206 can render using a selected content template. As depicted in FIG. 7, lecture details content template 212 includes fields for an image, the name of the lecturer, the time of the lecture, and the location of the lecture. Compared to scheduled lectures content template 210, a more detailed description of the topic of the lecture can be associated with lecture details content template 212.

Comparing FIGS. 5 and 7 shows that page template 200 and generic component 206 can be used to configure multiple web pages, each web page including different types of "primary content." "Primary content" is not tightly coupled to generic component 206. Instead generic component 206 dynamically applies associations between web page 32 and one or more content templates to render child content items that are associated with various types of "primary content."

Figure 8:
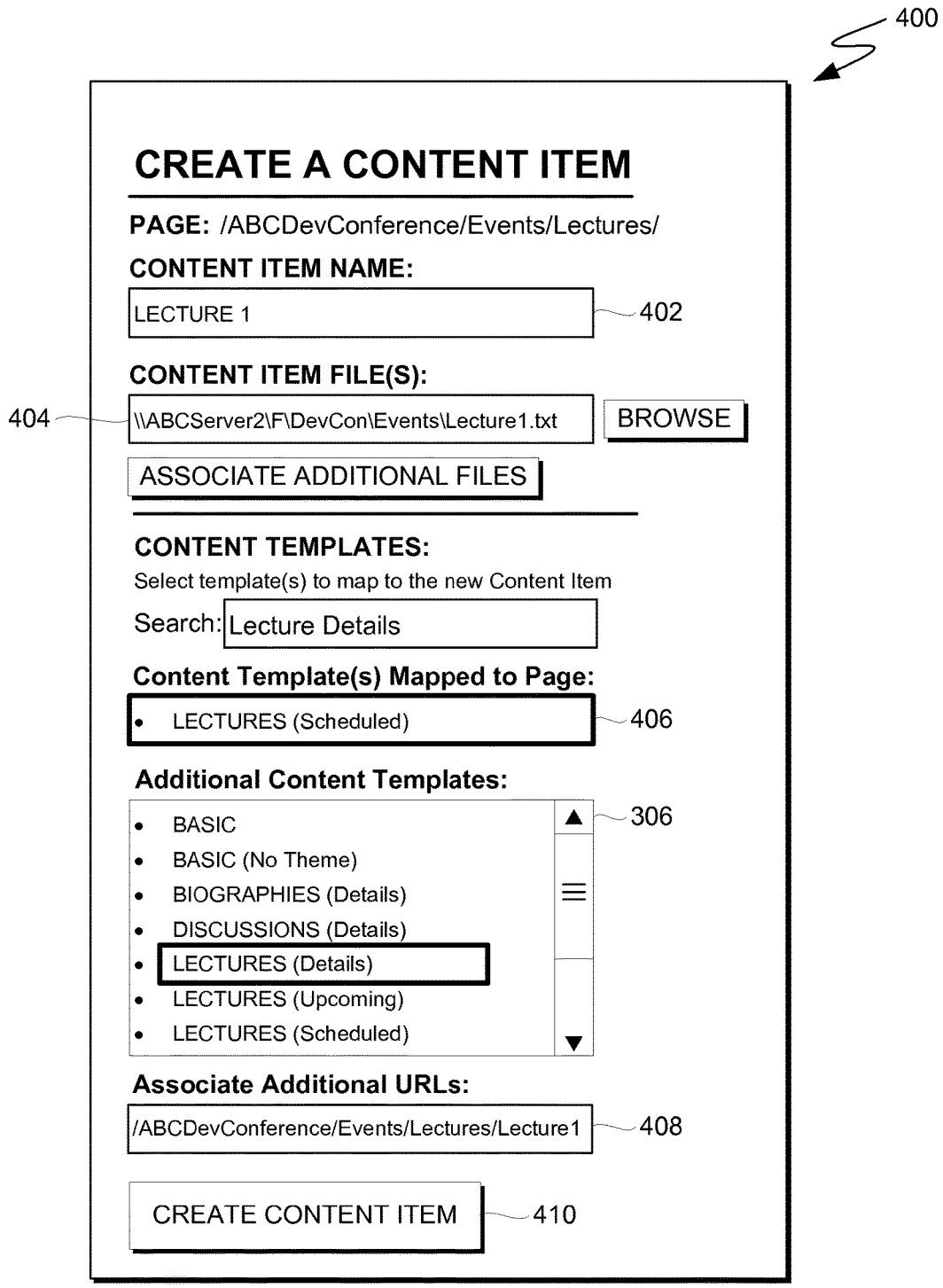
FIG. 8 is a schematic diagram of a user interface for creating a content item and associating the content item with one or more content templates, in accordance with an embodiment of the present disclosure.

FIG. 8 is a schematic diagram of a user interface for creating a content item and associating the content item with one or more content templates, in accordance with an embodiment of the present disclosure. Specifically, FIG. 8 depicts menu 400, which is presented on client device 20 via user interface 24. In FIG. 8, a content item that describes various attributes of a specific lecture is created.

In the embodiment depicted in FIG. 8, menu 400 includes content item name field 402 and file location field 404. Content item name field 402 is a text field in which a user of web content management software 22 can enter a name for a new content item. File location field 404 is a text field in which a user can enter, or select from a sub-menu, the location(s) of one or more files that include data that describes the content item.

In the embodiment depicted in FIG. 8, creating a content item using menu 400 generates and/or adds to metadata (e.g., metadata 36) that, at least in part, associates the created content item with one or more specific web pages (e.g., web page 32) as a child object and one or more content templates. In some embodiments, menu 400 dynamically associates the content item with a web page (e.g., a page in which a user of web content management software 22 is in the process of configuring). In other embodiments, the user of web content management software 22 manually associates the content item with one or more web pages. In yet other embodiments, in addition to any web page(s) that are automatically associated with the content item, the user can manually associate one or more web pages with the content item (e.g., via additional URL field 408). In various embodiments, associations between one or more content templates and the web page are used to filter a list of content templates from which the user of user interface 24 can associate one or more content templates with the child content item. In FIG. 8, for example, the child content item created via menu 400 is associated with the web page described with respect to FIGS. 4 and 5 (i.e., a web page that is associated with the "LECTURES (Scheduled)" content template). Web content management software 22 analyzes metadata 36 to determine whether or not any content templates are associated with the web page, and if so, presents mapped content template list 406 in menu 400. Accordingly, mapped content template list 406 is a list of content templates that are mapped (i.e., associated) with the web pages that are associated with the content item. The user can select content templates shown in mapped content template list 406 to associate the content item with the content template (i.e., a type of "primary content") via metadata 36. Mapped content template list 406 is advantageous in that it suggests to the user that the content item should be mapped to one or more of the content templates identified in mapped content template list 406, as opposed to having the user merely pick one or more content templates from content template list 306. Menu 400, however, includes content template list 306, so that the user can select additional or different content template(s) (e.g., one or more content templates in addition to the content template(s) appearing in mapped content template list 406) to associate with the content item. If the user intends to subsequently create another web page the will include the content item, the user may wish to pre-associate the content item with a relevant content template. In FIG. 8, for example, the user selected the "LECTURE (Details)" content template so that the web page discussed with respect to FIGS. 6 and 7 can utilize the content item shown in FIG. 8. In the embodiment depicted in FIG. 8, the user can enter the URL of another web page (e.g., the web page discussed with respect to FIGS. 6 and 7) into additional URL field 408 in order to associate the content item with a plurality of web pages.

Clicking or pressing on button 410 creates a content item that is identified by the name entered into content item name field 402 and described by the file(s) residing at the location identified in file location field 404. In addition, clicking or pressing on button 410 generates and/or adds to metadata (e.g., metadata 36) that associates the created content item with parent web page(s) and content template(s) selected and/or identified in menu 400.

FIG. 9 is a schematic diagram of a web page that includes a generic component that generates instructions to render a content item based, at least in part, on the association between the web page and the content template depicted in FIG. 5, in accordance with an embodiment of the present disclosure. Specifically, FIG. 9 depicts content items 214, 216, and 218 as rendered using instructions generated by generic component 206 in accordance with page template 200 and scheduled lectures content template 210. Content item 214 is the content item described with respect to FIG. 8. Content items 216 and 218 are additional content item that the user of web content management software 22 associated with the parent web page and scheduled lectures content template 210 (i.e., the "LECTURES (Scheduled)" template selected in menu 300) using menu 400.

Figure 10:
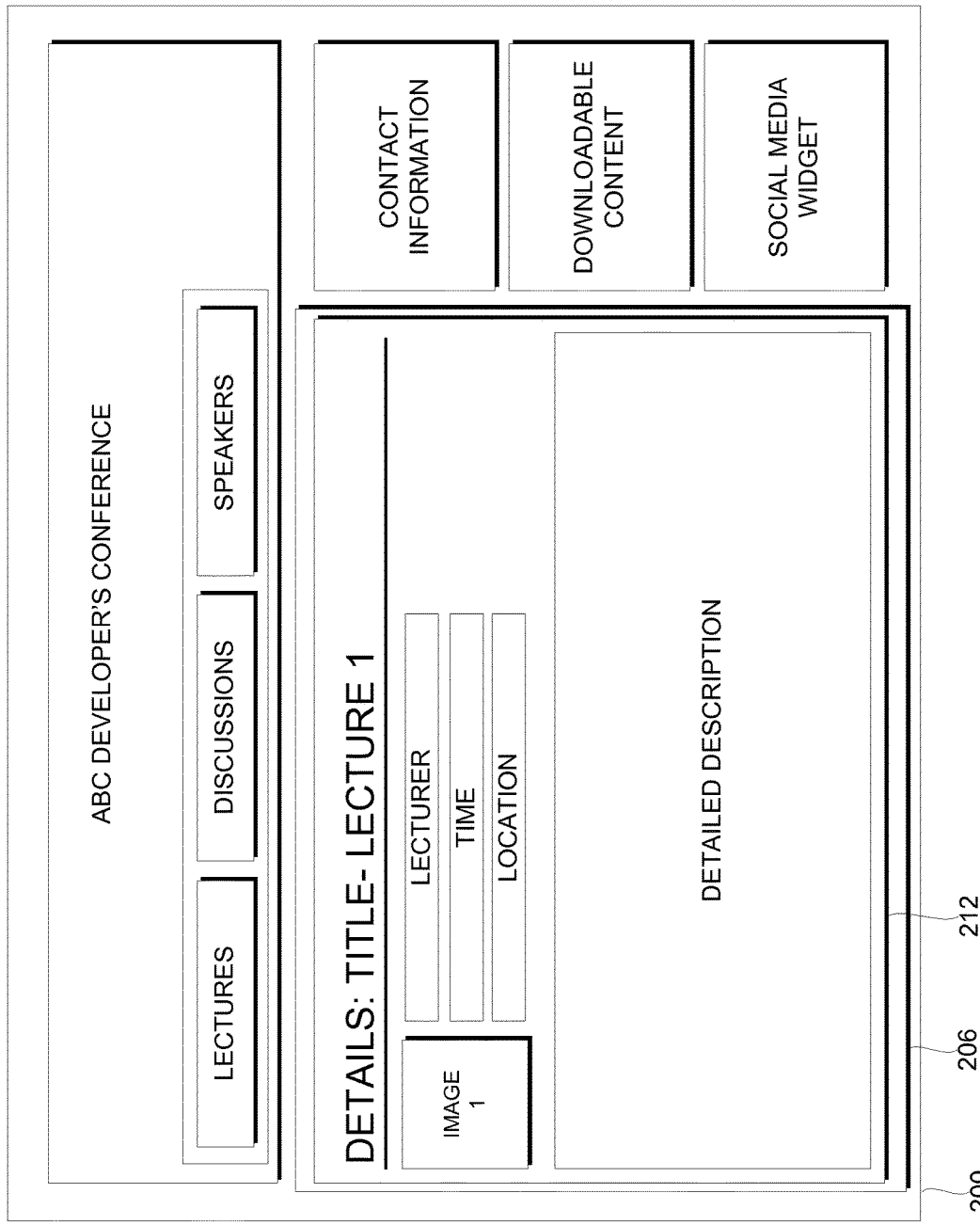
FIG. 10 is a schematic diagram of a web page that includes a generic component that generates instructions to render a content item based, at least in part, on the association between the web page and the content template depicted in FIG. 7, in accordance with an embodiment of the present disclosure.

FIG. 10 is a schematic diagram of a web page that includes a generic component that generates instruction to render a content item based, at least in part, on the association between the web page and the content template depicted in FIG. 7, in accordance with an embodiment of the present disclosure. Specifically, FIG. 10 depicts the content item described with respect to FIG. 8 as rendered using instructions generated by generic component 206 in accordance with page template 200 and lecture details content template 212.

Comparing FIGS. 9 and 10 shows that page template 200 and generic component 206 can be used to render multiple web pages, each web page including different types of "primary content." "Primary content" is not tightly coupled to generic component 206. Instead generic component 206 dynamically applies (i) association(s) between web page 32 and one or more content templates and (ii) association(s) between the one or more content templates and one or more content items in order to render the "primary content" of web page 32.

Figure 11:
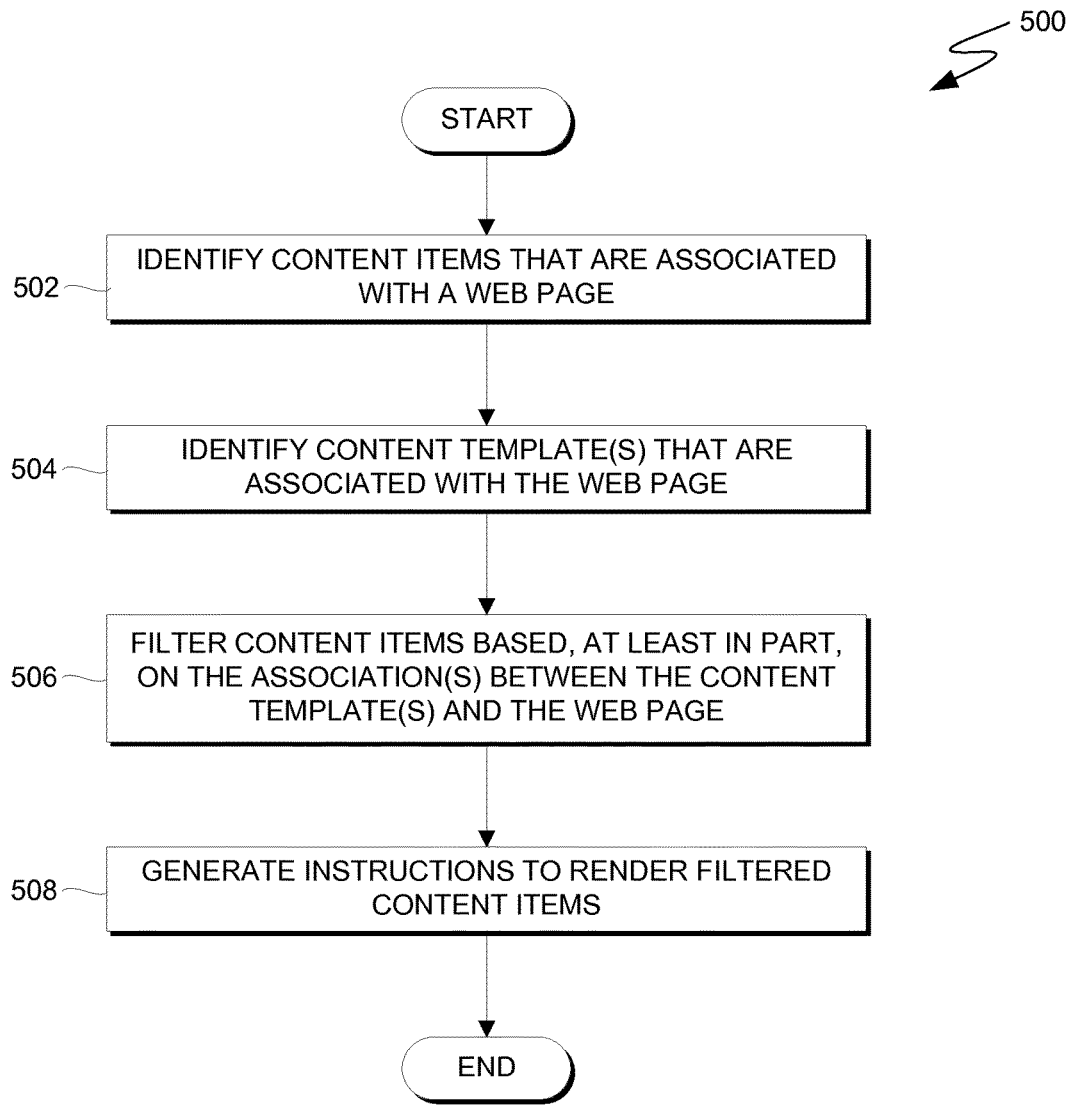
FIG. 11 is a flowchart depicting operations for presenting a web page including a generic component, on a computing device within the computing environment of FIG. 1, in accordance with an embodiment of the present disclosure.

FIG. 11 is a flowchart depicting operations for presenting a web page including a generic web page component, on a computing device within the computing environment of FIG. 1, in accordance with an embodiment of the present disclosure. For example, FIG. 11 is a flowchart depicting operations 500 of web content management software 22 on client device 20 within computing environment 10. More specifically, FIG. 11 depicts operations for rendering a web page (e.g., web page 32) that is based, at least in part, on a page template (e.g., page template 200) that includes a generic component for generating instructions to render "primary content" (e.g., generic component 206). In one embodiment, operations 500 represent, at least in part, operations of web content management software 22 in order to test web page 32 prior to deploying web page 32 on server 30. In another embodiment, operations 500 represent, at least in part, operations of server 30 for responding to a HTTP request for web page 32 from internet browser 52 of client device 50. Operations 500 will now be described with respect to operations of web content management software 22.

In operation 502, web content management software 22 (or a HTTP request on server 30) triggers a generic component (e.g., generic component 206) that identifies one or more content items (i.e., child content item(s)) that are associated with a web page (e.g., web page 32). In some embodiments, the generic component analyzes data 34 to identify the content item(s). Data 34 can include data that describes one or more content items that are "primary content" (e.g., entries in a list displayed in a "main area" of web page 32) and one or more content items that are "secondary content" (e.g., a banner, a teaser, or an advertisement carousel), as described herein.

In operation 504, the generic component identifies one or more content templates that are associated with the web page (e.g., scheduled lectures content template 210 and/or lecture details content template 212). In some embodiments, the generic component analyzes metadata 36 to identify content template(s) that are associated with (i.e., mapped to) the web page. Operation 504 is analogous to one or more operations that web content management software 22 performs in order to present mapped content template list 406 in menu 400, wherein web content management software 22 renders, in mapped content template list 406, identifiers that are associated with the content templates.

In operation 506, the generic component filters the content item(s) identified in operation 502 based, at least in part, on the content template(s) identified in operation 504. The content item(s) are filtered into a first group or a second group, wherein each content item in the first group is associated with at least one content template that is associated with the web page, and each content item in the second group is not associated with at least one content template that is associated with the web page. In other words, content items in the first group are "primary content" and content items in the second group are "secondary content."

In operation 508, the generic component generates instructions to render (e.g., on user interface 24 or internet browser 52) content items that are associated with the content template(s) that are associated with the web page (i.e., content item(s) that were filtered into the first group). In other words, the generic component generates instructions to render "primary content" in operation 508. Each content item is rendered based, at least in part, on a respective content template.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

As used herein, a list of alternatives such as "at least one of A, B, and C" should be interpreted to mean "at least one A, at least one B, at least one C, or any combination of A, B, and C."

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for creating content-type-aware web pages, the method comprising:

a generic component of a page template analyzing, by one or more computer processors, first web page metadata that is associated with a first web page to identify a first set of one or more content items that are associated with the first web page, wherein the page template defines a layout of a plurality of web pages, including the first web page, and wherein the page template includes an area that is allocated for the generic component and a plurality of areas that are allocated for respective customized components;

the generic component of the page template analyzing, by one or more computer processors, the first web page metadata to identify a first content template that is associated with the first web page, wherein the first content template represents, at least in part, a list of a plurality of entries;

the generic component of the page template filtering, by one or more computer processors, each content item of the first set of one or more content items into either a first group of primary content or a first group of secondary content based, at least in part, on the first content template, wherein:
each content item in the first group of primary content is associated with the first content template; and
each content item in the first group of secondary content is not associated with the first content template;

based, at least in part, on the first web page metadata, the generic component of the page template dynamically applying, by one or more computer processors, (i) an association between the first web page and the first content template and (ii) associations between each content item in the first group of primary content and respective fields of the first content template, and in response, generating, by one or more computer processors, instructions to render each content item in the first group of primary content within the respective fields of the first content template in the area of the page template that is allocated for the generic component, wherein the page template includes customized components that are associated with respective content items in the first group of secondary content, and wherein the customized components render each content item in the first group of secondary content on a plurality of web pages, including the first web page;

the generic component of the page template analyzing, by one or more computer processors, second web page metadata that is associated with a second web page to identify a second set of one or more content items that are associated with the second web page, wherein the page template defines a layout of the second web page in addition to the layout of the first web page;

the generic component of the page template analyzing, by one or more computer processors, the second web page metadata to identify a second content template that is associated with the second web page, wherein the second content template represents, at least in part, details that are associated with a single entry, and no other entry, of the list of the plurality of entries represented by the first content template;

the generic component of the page template filtering, by one or more computer processors, each content item of the second set of one or more content items into either a second group of primary content or a second group of secondary content based, at least in part, on the second content template, wherein:
  each content item in the second group of primary content is associated with the second content template; and
  each content item in the second group of secondary content is not associated with the second content template; and
based, at least in part, on the second web page metadata, the generic component of the page template dynamically applying, by one or more computer processors, (i) an association between the second web page and the second content template and (ii) associations between each content item in the second group of primary content and respective fields of the second content template, and in response, generating instructions, by one or more computer processors, to render each content item in the second group of primary content within the respective fields of the second content template in the area of the page template that is allocated for the generic component, wherein the customized components of the page template are associated with respective content items in the second group of secondary content, and wherein the customized components render each content item in the second group of secondary content on the plurality of web pages, including the second web page.

2. The method of claim 1, further comprising:
associating, by one or more computer processors, the first content template with the first web page in response to detecting a user interaction with a graphical element of a first menu.

3. The method of claim 2, wherein associating the first content template with the first web page generates a first metadata, the first web page metadata including the first metadata.

4. The method of claim 3, further comprising:
associating, by one or more computer processors, one content item of the first set of one or more content items with the first web page and the first content template in response to detecting a user interaction with a graphical element of a second menu.

5. The method of claim 4, wherein associating the one content item of the first set of one or more content items with the first web page and the first content template generates a second metadata, the web page metadata including the second metadata.

6. The method of claim 5, wherein the first menu includes a first list that identifies all accessible content templates and wherein the first content template is selected from the first list.

7. The method of claim 6, wherein the second menu includes (i) a second list that identifies all accessible content templates and (ii) a third list that identifies at least one content template that is associated with the first web page based, at least in part, on the first metadata.

8. A computer program product for creating content-type-aware web pages, the computer program product comprising:
  a computer readable storage medium and program instructions stored on the computer readable storage medium, the program instructions comprising:
    program instructions to, by a generic component of a page template, analyze first web page metadata that is associated with a first web page to identify a first set of one or more content items that are associated with the first web page, wherein the page template defines a layout of a plurality of web pages, including the first web page, and wherein the page template includes an area that is allocated for the generic component and a plurality of areas that are allocated for respective customized components;
    program instructions to, by the generic component of the page template, analyze the first web page metadata to identify a first content template that is associated with the first web page, wherein the first content template represents, at least in part, a list of a plurality of entries;
    program instructions to, by the generic component of the page template, filter each content item of the first set of one or more content items into either a first group of primary content or a first group of secondary content based, at least in part, on the first content template, wherein:
      each content item in the first group of primary content is associated with the first content template; and
      each content item in the first group of secondary content is not associated with the first content template;
    program instructions to, by the generic component of the page template, and based, at least in part, on the first web page metadata, dynamically apply (i) an association between the first web page and the first content template and (ii) associations between each content item in the first group of primary content and respective fields of the first content template, and in response, execute program instruction to generate instructions to render each content item in the first group of primary content within the respective fields of the first content template in the area of the page template that is allocated for the generic component, wherein the page template includes customized components that are associated with respective content items in the first group of secondary content, and wherein the customized components render each content item in the first group of secondary content on a plurality of web pages, including the first web page;
    program instructions to, by the generic component of the page template, analyze second web page metadata that is associated with a second web page to identify a second set of one or more content items that are associated with the second web page, wherein the page template defines a layout of the second web page in addition to the layout of the first web page;
    program instructions to, by the generic component of the page template, analyze the second web page metadata to identify a second content template that is associated with the second web page, wherein the second content template represents, at least in part, details that are associated with a single entry, and no other entry, of the list of the plurality of entries represented by the first content template;
    program instructions to filter, by the generic component of the page template, each content item of the second set of one or more content items into either a second group of primary content or a second group of secondary content based, at least in part, on the second content template, wherein:

each content item in the second group of primary content is associated with the second content template; and
each content item in the second group of secondary content is not associated with the second content template; and
program instructions to, by the generic component of the page template, and based, at least in part, on the second web page metadata, dynamically apply (i) an association between the second web page and the second content template and (ii) associations between each content item in the second group of primary content and respective fields of the second content template, and in response, executing program instruction to generate, by the generic component of the page template, instructions to render each content item in the second group of primary content within the respective fields of the second content template in the area of the page template that is allocated for the generic component, wherein the customized components of the page template are associated with respective content items in the second group of secondary content, and wherein the customized components render each content item in the second group of secondary content on the plurality of web pages, including the second web page.

9. The computer program product of claim 8, the program instructions further comprising:
program instructions to associate the first content template with the first web page in response to detecting a user interaction with a graphical element of a first menu.

10. The computer program product of claim 9, wherein the program instructions to associate the first content template with the first web page generate a first metadata, the first web page metadata including the first metadata.

11. The computer program product of claim 10, the program instructions further comprising:
program instructions to associate one content item of the first set of one or more content items with the first web page and the first content template in response to detecting a user interaction with a graphical element of a second menu.

12. The computer program product of claim 11, wherein the program instructions to associate the one content item of the first set of one or more content items with the first web page and the first content template generates a second metadata, the web page metadata including the second metadata.

13. The computer program product of claim 12, wherein the first menu includes a first list that identifies all accessible content templates and wherein the first content template is selected from the first list.

14. The computer program product of claim 13, wherein the second menu includes (i) a second list that identifies all accessible content templates and (ii) a third list that identifies at least one content template that is associated with the web page based, at least in part, on the first metadata.

15. A computer system for creating content-type-aware web pages, the computer system comprising:
one or more computer processors;
one or more computer readable storage media;
program instructions stored on the one or more computer readable storage media for execution by at least one of the one or more processors, the program instructions comprising:
program instructions to, by a generic component of a page template, analyze first web page metadata that is associated with a first web page to identify a first set of one or more content items that are associated with the first web page, wherein the page template defines a layout of a plurality of web pages, including the first web page, and wherein the page template includes an area that is allocated for the generic component and a plurality of areas that are allocated for respective customized components;
program instructions to, by the generic component of the page template, analyze the first web page metadata to identify a first content template that is associated with the first web page, wherein the first content template represents, at least in part, a list of a plurality of entries;
program instructions to, by the generic component of the page template, filter each content item of the first set of one or more content items into either a first group of primary content or a first group of secondary content based, at least in part, on the first content template, wherein:
each content item in the first group of primary content is associated with the first content template; and
each content item in the first group of secondary content is not associated with the first content template;
program instructions to, by the generic component of the page template, and based, at least in part, on the first web page metadata, dynamically apply (i) an association between the first web page and the first content template and (ii) associations between each content item in the first group of primary content and respective fields of the first content template, and in response, execute program instruction to generate instructions to render each content item in the first group of primary content within the respective fields of the first content template in the area of the page template that is allocated for the generic component, wherein the page template includes customized components that are associated with respective content items in the first group of secondary content, and wherein the customized components render each content item in the first group of secondary content on a plurality of web pages, including the first web page;
program instructions to, by the generic component of the page template, analyze second web page metadata that is associated with a second web page to identify a second set of one or more content items that are associated with the second web page, wherein the page template defines a layout of the second web page in addition to the layout of the first web page;
program instructions to, by the generic component of the page template, analyze the second web page metadata to identify a second content template that is associated with the second web page, wherein the second content template represents, at least in part, details that are associated with a single entry, and no other entry, of the list of the plurality of entries represented by the first content template;
program instructions to filter, by the generic component of the page template, each content item of the second set of one or more content items into either a second group of primary content or a second group of secondary content based, at least in part, on the second content template, wherein:
each content item in the second group of primary content is associated with the second content template; and each content item in the second group of secondary content is not associated with the second content template; and program instructions to, by the generic component of the page template, and based, at least in part, on the second web page metadata, dynamically apply (i) an association between the second web page and the second content template and (ii) associations between each content item in the second group of primary content and respective fields of the second content template, and in response, executing program instruction to generate, by the generic component of the page template, instructions to render each content item in the second group of primary content within the respective fields of the second content template in the area of the page template that is allocated for the generic component, wherein the customized components of the page template are associated with respective content items in the second group of secondary content, and wherein the customized components render each content item in the second group of secondary content on the plurality of web pages, including the second web page.

16. The computer system of claim 15, the program instructions further comprising:

program instructions to associate the first content template with the first web page in response to detecting a user interaction with a graphical element of a first menu.

17. The computer system of claim 16, wherein the program instructions to associate the first content template with the first web page generate a first metadata, the first web page metadata including the first metadata.

18. The computer system of claim 17, the program instructions further comprising:

program instructions to associate one content item of the first set of one or more content items with the first web page and the first content template in response to detecting a user interaction with a graphical element of a second menu.

19. The computer system of claim 18, wherein the program instructions to associate the one of the one or more content items with the web page and at least one of the one or more content templates generate a second metadata, the web page metadata including the second metadata.

20. The computer system of claim 19, wherein:

the first menu includes a first list that identifies all accessible content templates;

the first content template is selected from the first list; and the second menu includes (i) a second list that identifies all accessible content templates and (ii) a third list that identifies at least one content template that is associated with the first web page based, at least in part, on the metadata.

\* \* \* \* \*